(12) United States Patent
Ballard et al.

(10) Patent No.: US 11,438,229 B2
(45) Date of Patent: Sep. 6, 2022

(54) SYSTEMS AND METHODS FOR OPERATING SYSTEM DEPLOYMENT AND LIFECYCLE MANAGEMENT OF A SMART NETWORK INTERFACE CARD

(71) Applicant: Dell Products L.P., Round Rock, TX (US)

(72) Inventors: Lee E. Ballard, Georgetown, TX (US); Gaurav Chawla, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/744,727

(22) Filed: Jan. 16, 2020

(65) Prior Publication Data

US 2021/0226846 A1 Jul. 22, 2021

(51) Int. Cl.
*H04L 41/084* (2022.01)
*H04L 41/0806* (2022.01)
*H04L 49/20* (2022.01)
*G06F 9/4401* (2018.01)

(52) U.S. Cl.
CPC ........ *H04L 41/0843* (2013.01); *G06F 9/4416* (2013.01); *H04L 41/0806* (2013.01); *H04L 49/20* (2013.01)

(58) Field of Classification Search
CPC . H04L 41/0843; H04L 41/0806; H04L 49/20; G06F 9/4416
See application file for complete search history.

(56) References Cited

U.S. PATENT DOCUMENTS

| | | | | |
|---|---|---|---|---|
| 2006/0010316 | A1* | 1/2006 | Burokas | H04L 67/025 713/2 |
| 2010/0005190 | A1* | 1/2010 | Shah | H04L 41/0273 709/235 |
| 2012/0180076 | A1* | 7/2012 | Shutt | G06F 9/4411 719/327 |
| 2020/0252304 | A1* | 8/2020 | Franke | H04L 41/28 |
| 2021/0213605 | A1* | 7/2021 | Fischer | B25J 9/163 |

* cited by examiner

*Primary Examiner* — Joe Chacko
(74) *Attorney, Agent, or Firm* — Jackson Walker L.L.P.

(57) ABSTRACT

An information handling system may include a processor, a smart network interface card communicatively coupled to the processor, a basic input/output system configured to be the first code executed by the processor when the information handling system is booted and configured to initialize components of the information handling system into a known state, and a management controller configured for out-of-band management of the information handling system. The management controller may further configured to communicate information regarding the smart network interface card to a provisioning server, receive parameters from the provisioning server for a network-based boot of the smart network interface card, and communicate the parameters to the smart network interface card to enable the smart network interface card to boot from an image stored at the provisioning server.

12 Claims, 4 Drawing Sheets

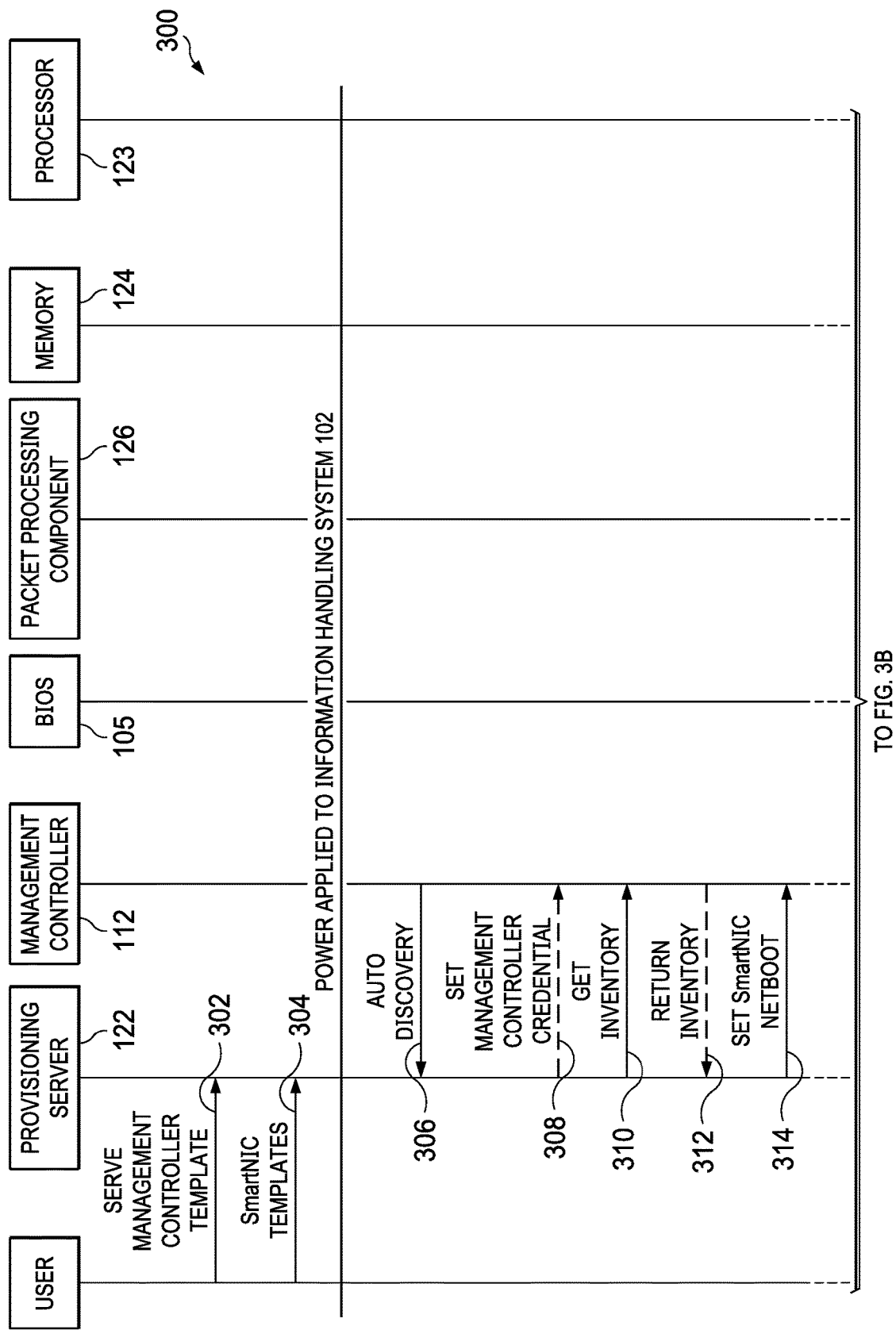

SYSTEMS AND METHODS FOR OPERATING SYSTEM DEPLOYMENT AND LIFECYCLE MANAGEMENT OF A SMART NETWORK INTERFACE CARD

TECHNICAL FIELD

The present disclosure relates in general to information handling systems, and more particularly to methods and systems for deploying an operating system to a smart network interface card and lifecycle management of the network interface card.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A smart network interface card or "smartNIC" may offer capabilities not found in traditional network interface cards (NICs). In addition to the stateful and custom offloads a smartNIC may provide, it may have an independent management domain with a separate operating system, independent credentials, and independent remote access. The deployment and maintenance of a smartNIC is much more complicated than the maintenance of firmware and drivers for a traditional NIC. In addition to firmware and drivers, a smartNIC may have very large software loads that are often specific to the overall solution stack. The size of a smartNIC software load and the variation of this software for each solution may prevent it from working within the existing firmware update mechanisms. Additionally, because a smartNIC may offer a separate remote management interface, it may have a much larger security footprint and the rate of security fixes that it may require may be beyond what a typical release process may support.

One alternate approach to using existing network interface card firmware update approaches to update a smartNIC is to treat the smartNIC like another server embedded inside the host server and use similar bare-metal deployment techniques. These techniques may have a minimum requirement of power and boot control. Ultimately, the smartNIC may draw power from its host server, so rebooting the host server will reboot the smartNIC but boot control would need to be provisioned (i.e., setting the smartNIC into PXE/http boot through in-band tools). Maintaining boot control in this manner may have several problems:

- Either in-band configuration is not authorized, or default credentials would have to be used for initial deployment and then synced and maintained in a separate credential database.
- If boot configuration changes, it may require manual intervention, and possibly physical access to recover. This situation may not be easy to support at the customer site.
- While a smartNIC may provide a separate management path, it may only function in full power mode when the smartNIC has reached a fully operational state and cannot be audited or configured in any way before the smartNIC operating system and applications are allowed to run. No lights out management or staged configuration is supported.

SUMMARY

In accordance with the teachings of the present disclosure, the disadvantages and problems associated with existing approaches to management of a smartNIC may be reduced or eliminated.

In accordance with embodiments of the present disclosure, an information handling system may include a processor, a smart network interface card communicatively coupled to the processor, a basic input/output system configured to be the first code executed by the processor when the information handling system is booted and configured to initialize components of the information handling system into a known state, and a management controller configured for out-of-band management of the information handling system. The management controller may further configured to communicate information regarding the smart network interface card to a provisioning server, receive parameters from the provisioning server for a network-based boot of the smart network interface card, and communicate the parameters to the smart network interface card to enable the smart network interface card to boot from an image stored at the provisioning server.

In accordance these and other embodiments of the present disclosure, a method may include, in an information handling system including a processor, a smart network interface card communicatively coupled to the processor, a basic input/output system configured to be the first code executed by the processor when the information handling system is booted and configured to initialize components of the information handling system into a known state: (i) communicating, with a management controller of the information handling system, information regarding the smart network interface card to a provisioning server; (ii) receiving, by the management controller, parameters from the provisioning server for a network-based boot of the smart network interface card; and (iii) communicating, with the management controller, the parameters to the smart network interface card to enable the smart network interface card to boot from an image stored at the provisioning server.

In accordance these and other embodiments of the present disclosure, an information handling system may include a processor, a smart network interface card communicatively coupled to the processor, a basic input/output system configured to be the first code executed by the processor when the information handling system is booted and configured to initialize components of information handling system into a known state, and a management controller configured for out-of-band management of the information handling system. The management controller may be further configured to communicate information regarding the smart network interface card to a provisioning server and based on the information, cause the basic input/output system to boot to a provisioning image configured to determine version information associated with software stored on the smart network interface card, perform updates based on the version information, and set a boot target for booting the smart network interface card on a subsequent powering on of the smart network interface card.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 3A and 3B (which may be collectively referred to herein as "FIG. 3") illustrate a flow chart of an example method for end use provisioning of a smartNIC, in accordance with embodiments of the present disclosure.

DETAILED DESCRIPTION

Figure 1:
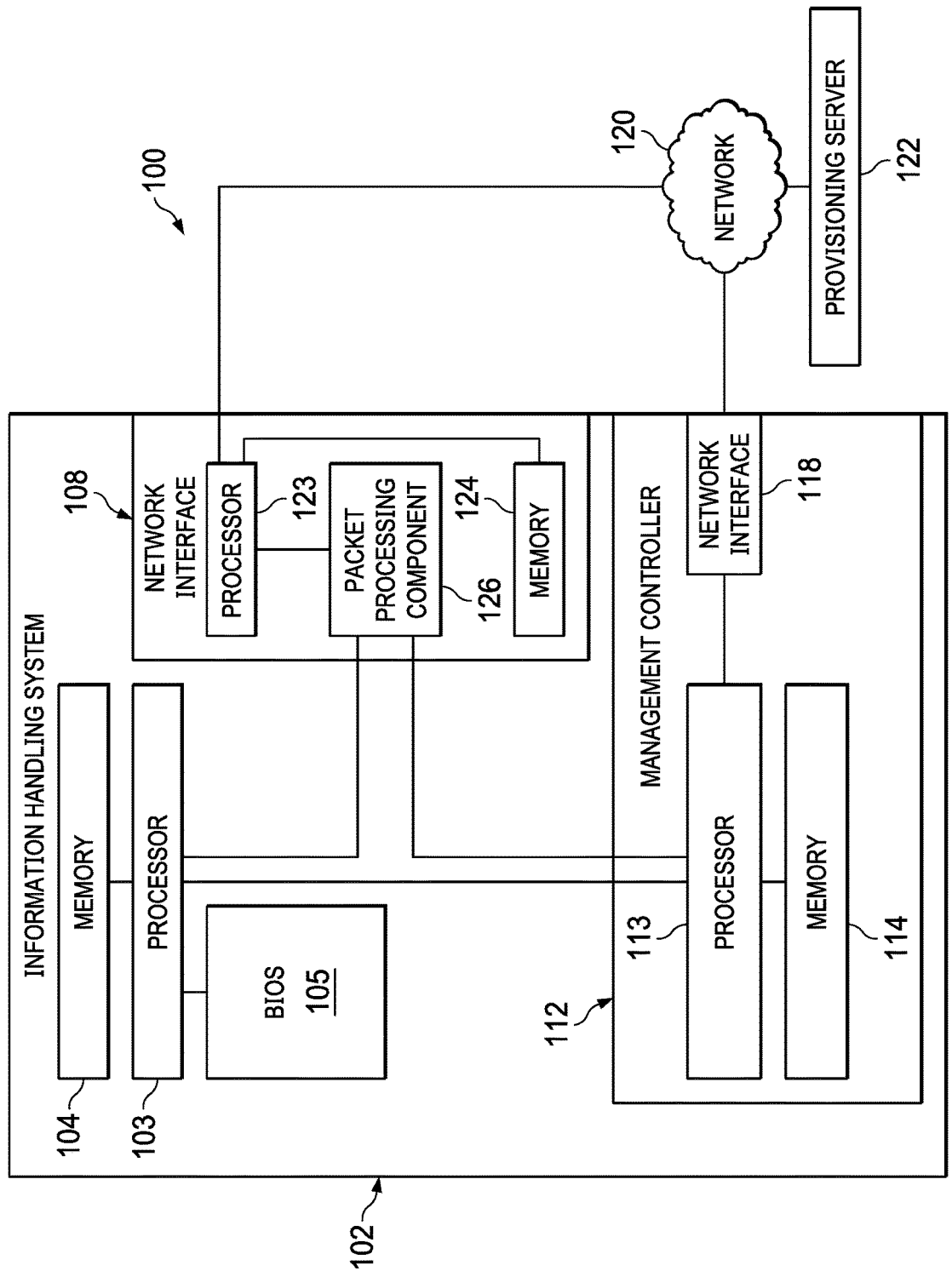
FIG. 1 illustrates a block diagram of an example system for operating system deployment and lifecycle management of a smartNIC, in accordance with embodiments of the present disclosure.
Figure 2:
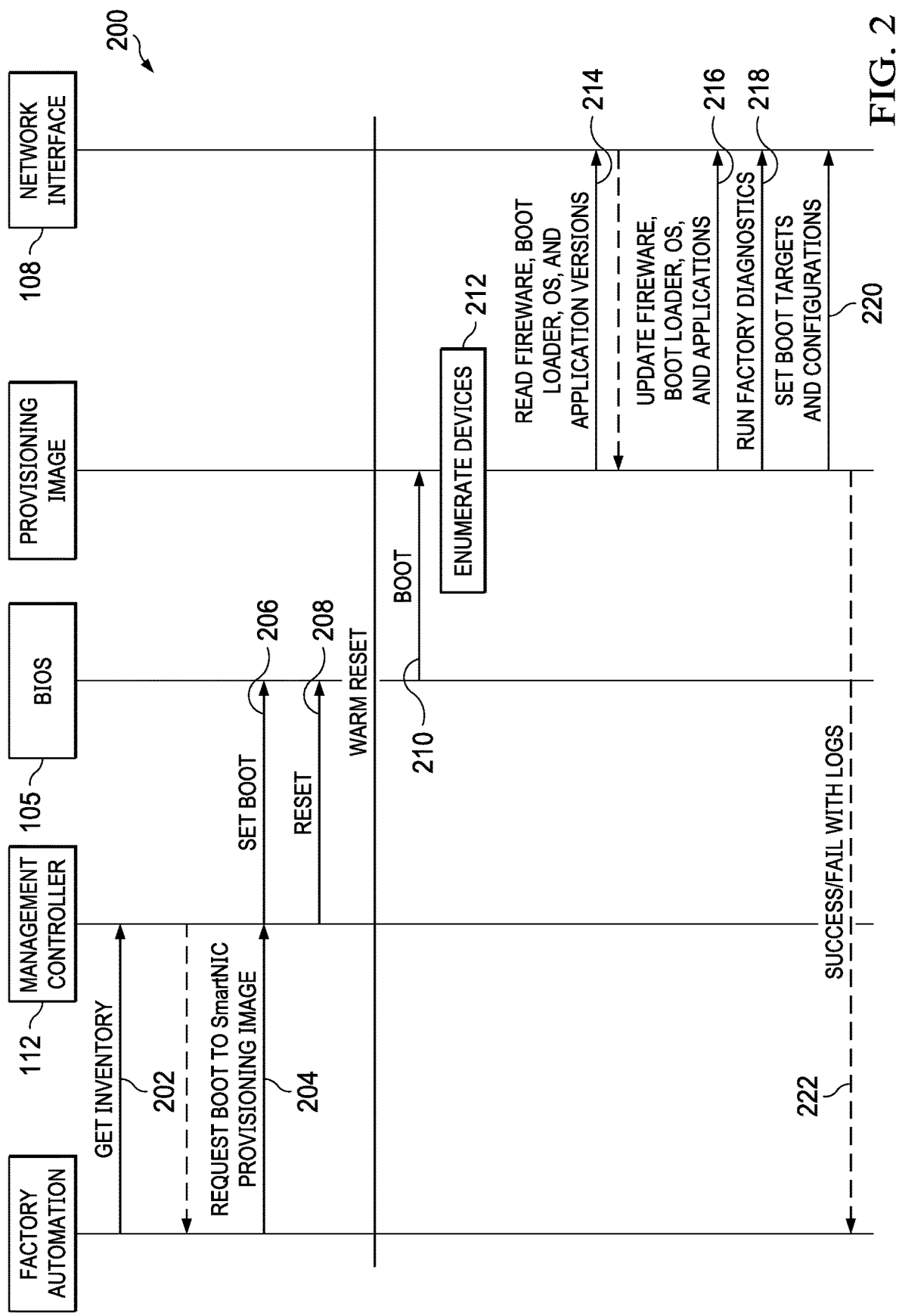
FIG. 2 illustrates a flow chart of an example method for factory provisioning of a smartNIC, in accordance with embodiments of the present disclosure.
Figure 3B:
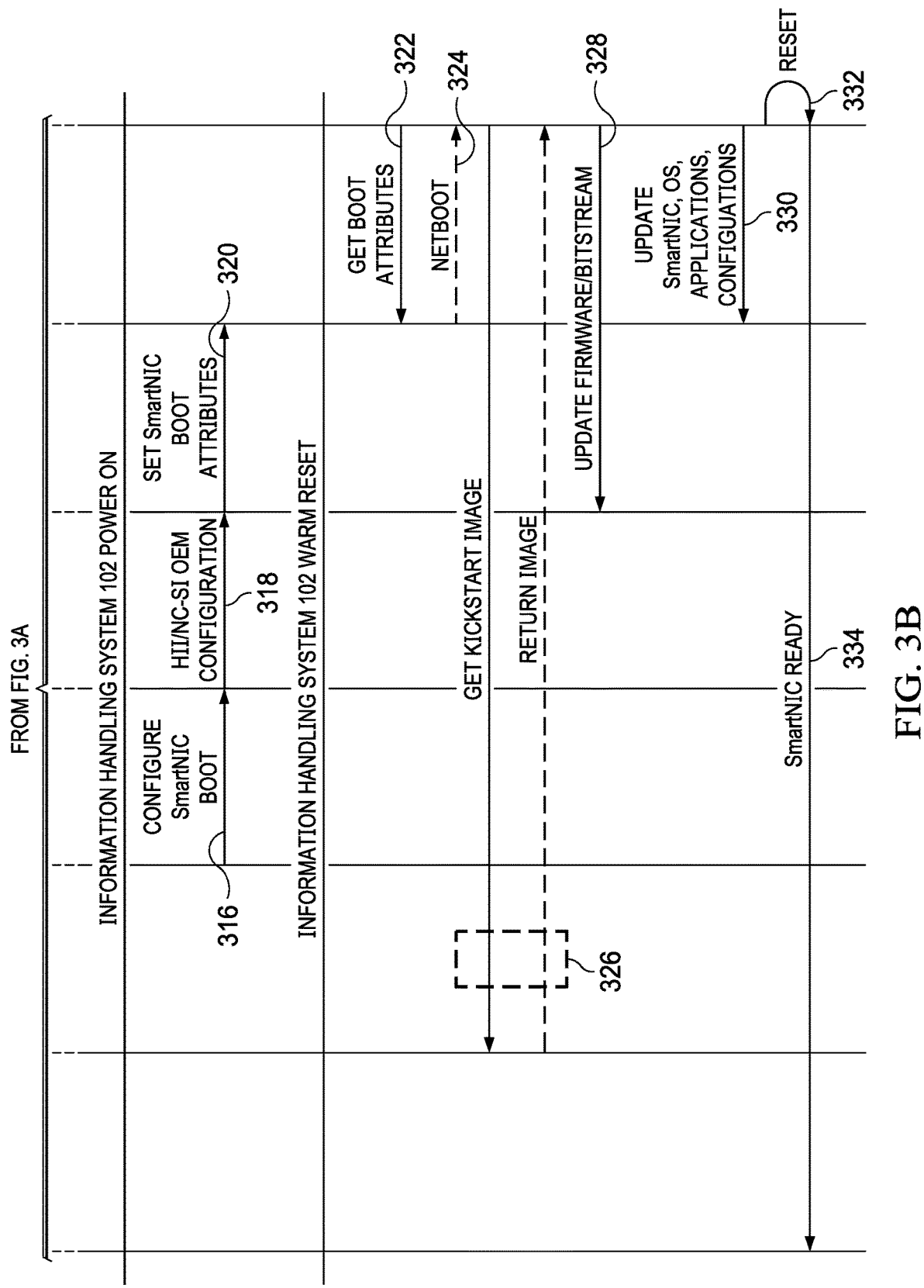

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example system 100 for operating system deployment and lifecycle management of a smartNIC, in accordance with embodiments of the present disclosure. As shown in FIG. 1, system 100 may include an information handling system 102, a network 120, and a provisioning server 122.

In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a basic input/output (BIOS) system 105 communicatively coupled to processor 103, a network interface 108 communicatively coupled to processor 103, and a management controller 112 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

Network interface 108 may comprise any suitable system, apparatus, or device operable to serve as an interface between information handling system 102 and one or more other information handling systems. Network interface 108 may enable information handling system 102 to communicate using any suitable transmission protocol and/or standard. In these and other embodiments, network interface 108 may comprise a network interface card, or "NIC." In particular, network interface 108 may comprise a smartNIC having a processor 123, memory 124, and packet processing component 126.

Processor 123 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 123 may interpret and/or execute program instructions and/or process data stored in memory 124 and/or another component of network interface 108.

Memory 124 may be communicatively coupled to processor 123 and may include any system, device, or apparatus configured to retain program instructions and/or data for a period of time (e.g., computer-readable media). Memory 124 may include RAM, EEPROM, a PCMCIA card, flash memory, magnetic storage, opto-magnetic storage, or any suitable selection and/or array of volatile or non-volatile memory that retains data after power to network interface 108 is turned off. Memory 124 may have stored thereon software and/or firmware which may be read and executed by processor 123 for carrying out the functionality of network interface 108.

Packet processing component 126 may be communicatively coupled to processor 123, memory 124, processor 103, and/or management controller 112 and may include any system, device, or apparatus configured to act as a switching interface between components of network interface 108 and components external to network interface 108. For example, packet processing component 126 may be communicatively coupled to management controller 112 via an Inter-Integrated Circuit (I2C) bus, Peripheral Component Interconnect Express (PCIe) bus, vendor-defined message (VDM) bus, or any other suitable bus or channel. Packet processing component 126 may be implemented with an application specific integrated circuit (ASIC), field-programmable gate array (FPGA), or any other suitable digital or analog circuitry.

Management controller 112 may be configured to provide out-of-band management facilities for management of information handling system 102. Such management may be made by management controller 112 even if information handling system 102 is powered off or powered to a standby state. Management controller 112 may include a processor 113, memory 114, and an out-of-band network interface 118 separate from and physically isolated from in-band network interface 108. In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off. Memory 114 may have stored thereon software and/or firmware which may be read and executed by processor 113 for carrying out the functionality of management controller 112.

Network interface 118 may comprise any suitable system, apparatus, or device operable to serve as an interface between management controller 112 and/or one or more other information handling systems. Network interface 118 may enable management controller 112 to communicate using any suitable transmission protocol and/or standard. In these and other embodiments, network interface 118 may comprise a network interface card, or "NIC."

In addition to processor 103, memory 104, BIOS 105, network interface 108, and management controller 112, information handling system 102 may include one or more other information handling resources.

Network 120 may comprise a network and/or fabric configured to couple information handling system 102 and provisioning server 122 to each other and/or one or more other information handling systems. In these and other embodiments, network 120 may include a communication infrastructure, which provides physical connections, and a management layer, which organizes the physical connections and information handling systems communicatively coupled to network 120. Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

Provisioning server 122 may comprise an information handling system, and may include any system, device, or apparatus configured to facilitate and manage end use provisioning of an operating system for network interface 122, as described in greater detail below.

FIG. 2 illustrates a flow chart of an example method 200 for factory provisioning of a smartNIC, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

During factory provisioning, information handling system 102 may begin with an unlocked smartNIC implemented by network interface 108. The smartNIC may not have direct network access in the factory so in-band configuration for the smartNIC may be preferred, during provisioning, and in-band management may be used to enable out-of-band for the end user.

At step 202, a factory automation process may request an inventory of information handling system 102 maintained by management controller 112. At step 204, after receiving the inventory back from management controller 112, the factory automation process may communicate to management controller 112 a request to boot the entire host information handling system 102 to a smartNIC provisioning image. In some embodiments, such provisioning image may be a disk image of an optical disk, such as an ISO image. Many smartNICs lack standard update packages and drivers so the best option may be to boot BIOS 105 to a vendor-specific host operating system image such as the smartNIC provisioning image.

At step 206, in response to the request, management controller 112 may set BIOS 105 to boot from the provisioning image. At step 208, management controller 112 may cause reset of BIOS 105.

At step 210, BIOS 105 may undergo a warm reset and boot from and execute the provisioning image.

At step 212, the provisioning image may enumerate devices (e.g., PCIe) of information handling system 102, in particular network interface 108. At step 214, after enumerating network interface 108, the provisioning image may read from network interface 108 its current firmware, boot loader, operating system (OS), and application versions. After receiving such version information, at step 216, the provisioning image may communicate appropriate updates to firmware, boot loader, OS, and applications to network interface 108 (which network interface 108 may store to its memory 124).

At step 218, the provisioning image may perform factory diagnostics of network interface 108. At step 220, the provisioning image may set a boot target for network interface 108 (e.g., identifying an image for network interface 108 to boot from) and/or perform other configurations of network interface 108. For example, the boot loader and firmware may be the targets set by the provisioning image, such that information handling system 102 may ship to an end user with a base image stored within network interface 108. It is at this step that a network boot may be set for network interface 108.

At step 222, the provisioning image may communicate to the factory automation process an indication of success or failure of factory provisioning and/or event/status logs associated with factory provisioning. After completion of step 222, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

In some embodiments, during the factory provisioning process described above, the provisioning image may partition memory 124 of network interface 108 to have a recovery partition and store within such partition a restore image (e.g., a "restore to factory defaults" image). Once deployed, network interface 108 may have this recovery partition as a recovery option. For example, if an OS of network interface 108 becomes corrupted, management controller 112 could set network interface 108 to boot to the recovery partition and restore network interface 108 to factory defaults.

FIG. 3 illustrates a flow chart of an example method 300 for end use provisioning of a smartNIC, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, an end user (e.g., an enterprise administrator) may configure a management controller configuration template for management controller 112. Similarly, at step 304, the end user may configure a smartNIC configuration template for network interface 108.

At step 306, in response to power being applied to information handling system 102, management controller 112 may use auto discovery or another defined mechanism to register with provisioning server 122. In response, at step 308, provisioning server 122 may establish credentials with management controller 112 allowing provisioning server 122 to inventory information handling system 102.

At step 310, provisioning server 122 may communicate a request to management controller 112 for an inventory of information handling system 102. In response, at step 312, management controller 112 may return the inventory, which may include information about network interface 108 including which type of smart NIC it is, its serial number, its Media Access Control (MAC) address, and/or other information. Knowing the MAC address of network interface 108 may be critical to associating a smartNIC with a particular host information handling system 102 for a subsequent smartNIC network boot (or potentially multiple host servers in a multi-host deployment). At step 314, provisioning server 122 may communicate a request to management controller 112 to set network interface 108 for network boot.

Upon powering on of information handling system 102, BIOS 105 may initialize and at step 316, management controller 112 may configure smartNIC boot on BIOS 105. To address issues associated with smartNIC boot configuration, as part of such configuration, management controller 112 may set the pre-OS network settings and boot order using smartNIC UEFI Human Interface Infrastructure (HII) or an original equipment manufacturer Network Controller Sideband Interface (NC-SI). The value of these new attributes may be maintained in the inventory of information handling system 102 under its associated NIC object. If the attribute values are not capable of working in a particular environment (i.e., a redeploy scenario or an environment that requires static network configuration), provisioning server 122 may set the correct boot attributes via Redfish or a similar mechanism.

At step 318, BIOS 105 may communicate new attributes to packet processing component 126 (e.g., original equipment manufacturer Network Controller Sideband Interface (NC-SI)). The HII or NC-SI is generally provided by packet processing component 126 and not processor 123. Accordingly, at step 320, packet processing component 126 may forward these new attributes to a portion of memory 124 for storage within network interface 108 that the smartNIC bootloader has been configured to read.

At step 322, the boot loader of network interface 108 executing on processor 123 may retrieve the boot attributes stored in memory 124. At step 324, such attributes, including an attribute for network interface 108 to perform a network boot, may be loaded from memory 124 by processor 123 and executed by processor 123. Accordingly, at step 326, network interface 108 may perform a network boot to boot from a kickstart image provided from provisioning server 122.

At step 328, the kickstart image may update firmware and bitstreams of network interface 108 via packet processing component 126. At step 330, the kickstart image may update the OS, applications, and configuration of network interface 108 via memory 124.

At step 332, the kickstart image may cause network interface 108 to reset itself, after which at step 334 the configuration attributes may instruct network interface 108 to register itself with provisioning server 122, thus marking network interface 108 ready for normal operation. After completion of step 334, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

In the case for which a smartNIC implemented by network interface 108 does not provide an HII driver (most likely the case for when packet processing component 126 is implemented by an FPGA), management controller 112 may forward Redfish requests to the smartNIC over an internal Internet Protocol network of information handling system 102. Alternatively, management controller 112 may implement a Redfish provider for the smartNIC and use an internal Internet Protocol network to implement this provider. As another possibility, a service module of management controller 112 may be used to either proxy Redfish requests from network interface 118 to a host or smartNIC network or use the service module as a provider. The service module may implement a Redfish provider for the smartNIC and use a secure shell (SSH) interface to the smartNIC over a smartNIC network of the host system of information handling system 102. The service module may input/output control through a host driver for the smartNIC in order to write to a scratchpad of memory 124 that may later be read by processor 123.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
a central processing unit (CPU);
an in-band network interface, comprising a smart network interface card (SNIC) communicatively coupled to the CPU, wherein the SNIC includes a SNIC processor suitable for executing a distinct operating system and a SNIC random access memory storing software or firmware executable by the SNIC processor;
a basic input/output system configured to be the first code executed by the CPU when the information handling system is booted and configured to initialize components of the information handling system into a known state; and
a management controller including an out-of-band-network interface comprising a management controller network interface, wherein the management controller network interface is distinct from the SNIC and enables out-of-band management of the information handling system, wherein the management controller is further configured to:
communicate information regarding the SNIC to a provisioning server;
receive parameters from the provisioning server for a network-based boot of the SNIC; and
communicate the parameters to the SNIC to enable the SNIC to boot from an image stored at the provisioning server.

2. The information handling system of claim 1, wherein the SNIC is configured to, based on the parameters, boot from the image stored at the provisioning server and update one or more of an operating system, applications, and configuration of the SNIC.

3. The information handling system of claim 1, wherein the parameters include one or more boot attributes communicated to the SNIC via a Unified Extensible Firmware Interface Human Interaction Interface associated with the SNIC.

4. The information handling system of claim 1, wherein the parameters include one or more boot attributes communicated to the SNIC via a Network Controller Sideband Interface associated with the SNIC.

5. The information handling system of claim 1, wherein the management controller is further configured to establish credentials with the provisioning server for provisioning of the SNIC by associating a unique network address of the SNIC with the information handling system.

6. The information handling system of claim 1, wherein a service module of the management controller is configured to implement a Redfish server or proxy to facilitate provisioning of the SNIC.

7. A method comprising, in an information handling system including a central processing unit (CPU), an in-band network interface, comprising a smart network interface card (SNIC), wherein the SNIC includes a SNIC processor suitable for executing a distinct operating system and a SNIC random access memory storing software or firmware executable by the SNIC processor, communicatively coupled to the CPU, a basic input/output system configured to be the first code executed by the CPU when the information handling system is booted and configured to initialize components of the information handling system into a known state:
communicating, by an out-of-band-network interface comprising a management controller network interface of a management controller of the information handling system via, distinct from the smart network interface card, for out-of-band management of the information handling system, information regarding the SNIC to a provisioning server;
receiving, by the management controller, parameters from the provisioning server for a network-based boot of the SNIC; and
communicating, with the management controller, the parameters to the SNIC to enable the SNIC to boot from an image stored at the provisioning server.

8. The method of claim 7, wherein the SNIC is configured to, based on the parameters, boot from the image stored at the provisioning server and update one or more of an operating system, applications, and configuration of the SNIC.

9. The method of claim 7, wherein the parameters include one or more boot attributes communicated to the SNIC via a Unified Extensible Firmware Interface Human Interaction Interface associated with the SNIC.

10. The method of claim 7, wherein the parameters include one or more boot attributes communicated to the SNIC via a Network Controller Sideband Interface associated with the SNIC.

11. The method of claim 7, further comprising establishing, by the management controller, credentials with the provisioning server for provisioning of the SNIC by associating a unique network address of the SNIC with the information handling system.

12. The method of claim 7, further comprising implementing, with a service module of the management controller, a Redfish server or proxy to facilitate provisioning of the SNIC.

* * * * *